F. A. HEADSON.
PACKING.
APPLICATION FILED MAY 12, 1913.

1,128,247.

Patented Feb. 9, 1915.

Witnesses:

Inventor:
Frank A. Headson,
By Poole & Cromer
Attys.

UNITED STATES PATENT OFFICE.

FRANK A. HEADSON, OF MILWAUKEE, WISCONSIN, ASSIGNOR TO H. W. JOHNS-MANVILLE COMPANY, OF MILWAUKEE, WISCONSIN, A CORPORATION OF NEW YORK.

PACKING.

1,128,247.  Specification of Letters Patent.  Patented Feb. 9, 1915.

Application filed May 12, 1913. Serial No. 766,954.

*To all whom it may concern:*

Be it known that I, FRANK A. HEADSON, a citizen of the United States, and a resident of Milwaukee, in the county of Milwaukee and State of Wisconsin, have invented certain new and useful Improvements in Packing; and I do hereby declare that the following is a full, clear, and exact description thereof, reference being had to the accompanying drawings, and to the letters of reference marked thereon, which form a part of this specification.

This invention relates to an article of manufacture adapted to be used as a packing for packing piston rods or other moving rods or parts of engines and machinery, or adapted to be used where a steam-tight or water-tight joint is to be maintained, or for other or similar purposes.

The principal object of the invention is to provide a simple, economical and efficient packing for piston rods or other parts of engines or machines, or for other or similar purposes.

A further object is to provide a packing for piston rods or other or similar parts, adapted to maintain a tight joint and to permit and withstand the effects of expansion and contraction due to variations in temperature, and to provide a packing which is durable and efficient when subjected to the effects of steam, heat, moisture, and friction, or other conditions to which a packing is subjected in use.

Other and further objects of the invention will appear from an examination of the following description and claims and from an inspection of the accompanying drawings which are made a part hereof.

A packing comprising in its construction a plurality of integral layers of fibrous material folded and connected at their margins as herein described and illustrated is adapted to enable the entire outer surface of the packing, if desired, to be formed of the folded marginal portions or side surface portions of the material or of the layers or plies, so that no selvage edges are necessarily exposed or in contact with the surface or surfaces to be packed, and the packing is adapted to expand and contract as the temperature is varied, and will be efficient and durable.

The invention consists in the features, combinations, and details of construction herein described and claimed.

Figure 1:
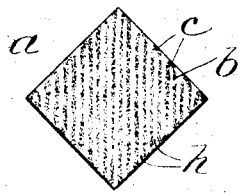
Figure 3:
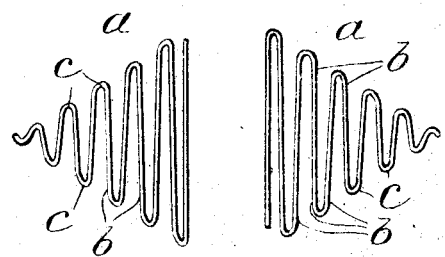
Figure 2:
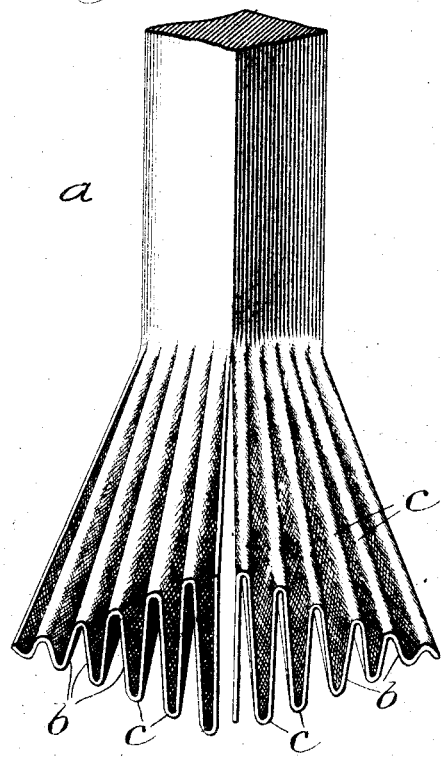
Figure 4:
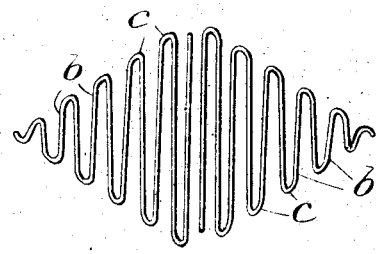
Figure 5:
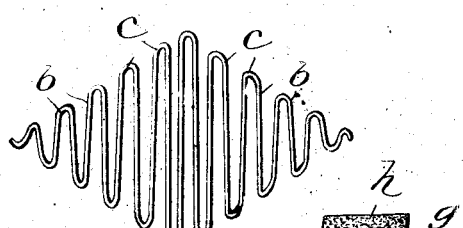
Figure 6:
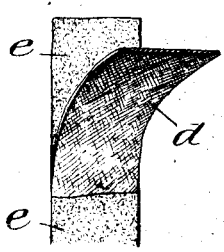
Figure 7:
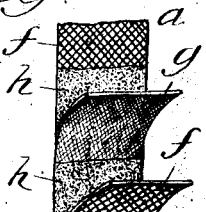

In the accompanying drawings, Figure 1 is a view in end elevation of a strip, block or piece of packing made in accordance with my invention and improvements; Fig. 2, a view in perspective of a packing strip or piece of packing made in accordance with my invention and improvements, showing a portion of the packing shown in Fig. 1 as it would appear when complete or after being removed from the molds and after having been folded and subjected to heat and pressure, and showing a portion of the sheets of fibrous material, canvas, asbestos, or fabric containing fibrous asbestos, or asbestos and organic fibrous material of which the packing is formed as it would appear when the sheets or strips are folded into longitudinal layers each coated with rubber cement or cementitious material and in condition to be subjected to the action of heat and pressure or molded; Fig. 3, an end view of two strips or sheets of flexible fibrous material, each so folded as to form a plurality of longitudinal layers or plies all coated with rubber cement or having cement therebetween, adapted to be compressed, so that each sheet or strip will form half of a complete section or strip of the packing when the layers are compressed and cemented together; Fig. 4, a similar view, showing two sheets or strips of flexible fibrous material folded to form longitudinal plaits or layers coated with adhesive material, such as rubber cement, and placed in position to be heated and pressed together so that each is adapted to form half of a complete section of flexible packing when compressed or molded; Fig. 5, a similar view of a single sheet or strip of fibrous flexible material folded to form a complete section or block of packing made in accordance with my invention; Fig. 6, a plan view of a sheet or strip of flexible fibrous material or fabric consisting of alternate layers of fabric, fibrous material, or canvas and rubber cement, showing the layer of canvas with a coating or layer of rubber cement on each side thereof, suitable for making a packing in accordance with my invention; Fig. 7, a similar view of a sheet or strip of laminated flexible fibrous material or fabric comprising a layer or layers of asbestos and a layer of organic material or fabric united by means of rubber cement or similar suitable cementitious material, and adapted to form a packing strip or sheet suitable for folding and molding into the form of packing embodying my invention; and Fig. 8, a similar view of a sheet or strip of fibrous material or fabric comprising a sheet or layer of asbestos and a layer of rubber cement on each side of and in adhesive contact with the asbestos, adapted to be folded and subjected to heat and pressure or molded in a heated condition after being folded so as to form a flexible packing or strip for making packing, in accordance with my invention. In this figure is also shown a layer of organic material or fabric which may be a cloth or canvas and with its outer layer of rubber cement may be used in connection with the layer of asbestos or omitted, as desired.

In making a packing in accordance with my invention and improvements, I provide one or more strips or sheets $a$ of suitable flexible fibrous material or fabric and fold the same in such a manner as to form a plurality of longitudinal layers, plaits or plies $b$, each having a folded marginal edge or marginal portion $c$ connected and integral with the marginal edge or portion of the next adjacent layer, plait or ply. Each strip or sheet of flexible fibrous material or fabric is, by preference, formed of canvas or asbestos, or layers of asbestos and organic flexible fibrous material or fabric coated with rubber cement or cementitious or adhesive material or provided with layers of such cementitious material between the layers of fabric or fibrous material, all of the layers or plaits formed by a strip or sheet of flexible fibrous material and cementitious material being integral and having their folded marginal side surface portions all exposed or so disposed as to form the outer surface portion of the packing when the latter is completed.

In making my improved packing, I provide, by preference, a plurality of sheets or strips $a$, as indicated in Figs. 1, 2, 3 and 4, each of which is folded so as to form a plurality of longitudinal layers, plaits or plies $b$, the inner layers formed by said sheets or strips, respectively, being of the greatest width and adapted to form the central portion of the packing when complete, and all of the layers formed by said sheets or strips, respectively, being of unequal or uniformly diminishing width and being so folded that each of such strips or sheets with its cementitious material forms half of a rectangular packing when the packing is complete.

The sheets or strips of flexible fibrous material or fabric shown in Figs. 1 to 5 inclusive are formed, by preference, of layers of fibrous asbestos and fibrous organic material or fabric having a layer or layers of rubber cement $d$ therebetween and permeating the interstices between the fibers and cementing the layers of fibrous material together so as to form a flexible sheet or strip. The asbestos is, by preference, woven so as to form an asbestos cloth or fabric the woven strands of which are disposed obliquely or at an angle to the fibers of organic material and obliquely with respect to the side margins of the strip or sheet. (See Fig. 7). A sheet or strip is thus formed comprising layers of asbestos, and organic fibrous material or fabric having layers of rubber cement or cementitious material therebetween and permeating the interstices between the strands and fibers of the fabric.

The rubber cement or cementitious material $d$, preferably in the form of semi-vulcanized rubber or rubber cement, may be applied to one or both sides but is applied, by preference, to both sides of the sheet or strip before the latter is folded. The coating of cementitious material or rubber cement is thus applied to both sides or interposed between the layers or plies of the folded sheet or strip in a heated, moist or liquid condition, and the sheet or strip having been folded, as already suggested, so as to form a plurality of longitudinal layers or plies each having an outer marginal portion connected and integral with the next adjacent layer or layers, and the coating or layers of rubber cement or cementitious material being upon or interposed between such layers, the folded sheet or sheets is subjected to the action of heat and pressure sufficient to cause the adhesive material to permeate the interstices of the layers of fabric. The heat and pressure are applied, by preference, while the material is in a suitable mold and the adhesive material or rubber thus becomes semi-vulcanized and is allowed to set and serves to securely hold together the layers and the fibers of which the fibrous layers are formed. The necessary degree of heat and the pressure may be applied to the layers of fibrous material in forming the sheets or strips to be folded by passing the material between rolls and at the same time applying the required degree of heat, and the sheets thus formed of layers of asbestos and fibrous organic material and rubber cement, or of canvas coated with rubber cement or cementitious material preferably on both sides, or formed of asbestos and cementitious material such as rubber, may then be folded, as described, and subjected to the required heat and pressure to cause the rubber cement to become vulcanized or partially vulcanized so as to form a flexible packing strip or sheet of material of which a packing or packing strip is to be formed. The pressure, by means of which the folded layers are compressed and united.

may be applied by means of molds which may be of any desired, ordinary or well known form, the material being subjected to the action of the required degree of heat to cause the rubber to become partially or semi-vulcanized while in the molds and being allowed to set so as to securely hold the layers together.

The sheet or material of which the packing is to be formed is, by preference, so folded that the layers or laminations extend diagonally with respect to the square or rectangular packing to be formed thereby, as shown in Figs. 1 and 2. The outer side surfaces of the folded marginal portions c of the layers b are thus exposed at all points throughout the entire outer surface of the packing and the entire surface of the square or rectangular packing may thus be formed by or consist of the folded marginal portions c which extend longitudinally of the packing throughout its entire length. The folded side surface portions of the sheet or strip which form the folded marginal portions of the layers are thus so disposed as to enable a packing to be formed having no selvage edge exposed or forming any part of the outer surface of the packing. The packing is thus adapted to expand and contract to a maximum extent and is thus enabled to maintain a steam-tight or water-tight joint under greatly varying conditions of temperature and without becoming disintegrated by reason of such expansion or contraction, or by reason of the heat or moisture to which the packing is exposed, or by reason of the stresses and strains and friction to which it is subjected in use.

In Fig. 7 is shown a very desirable form of laminated sheet adapted to be folded so as to form a packing as above described, the laminated sheet there shown consisting of two layers of asbestos f, each of which is, by preference, woven so as to form asbestos cloth. A layer of organic or flexible fibrous material or fabric g which may be made of cotton, linen, jute, or similar material, preferably woven, is laid between the layers f or in position to be cemented to one or both of the layers f, and the layers f and g are held together by means of a coating of glue, rubber cement or cementitious material h, the layers f and g of the sheet or strip thus formed being firmly secured together by the cementitious material or rubber, all of said elements being subjected to heat and pressure sufficient to cause the cementitious material to permeate the interstices of the layers f and g, which are by preference so disposed that the outer surfaces of the laminated sheet or strip are both formed of asbestos or refractory material. The organic or relatively strong and more flexible material g being, by preference, between the outer layers of asbestos or refractory material, is adapted to strengthen the sheet thus formed. The asbestos or refractory material is adapted to entirely cover and protect the inner layer of less refractory or more combustible material g and, as the outer coating of cementitious material on the outer surface of the finished packing soon wears off, the asbestos forms an anti-friction bearing surface which is adapted to be kept thoroughly lubricated while subjected to great heat and is adapted to withstand great heat. The disintegration and wearing away of the comparatively less flexible asbestos, due to the action of the moisture or heat and friction or other causes, is prevented by the more flexible and strong inner layer of organic material g which greatly increases the strength of the packing to withstand the strains to which it is subjected in use.

In Fig. 6 is shown a portion of a strip or sheet of flexible fibrous material comprising or consisting of a layer d of canvas having a layer or coating of rubber cement e on each side thereof and all adapted to be folded and subjected to heat and pressure and molded as shown in Figs. 1 to 5 inclusive, or as described, so as to form a flexible packing when the rubber cement is thus partially vulcanized or semi-vulcanized and allowed to set.

Figure 8:
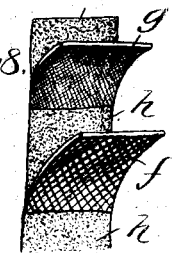

A sheet of woven asbestos or asbestos fabric may be used instead of the layer of canvas d shown in Fig. 6 and with the coating or layers of cementitious material or rubber e on both sides thereof, and either with or without fabric or cloth or canvas formed of fibrous organic material, as shown in Fig. 8.

I claim:

1. An angular packing-strip comprising in its construction parallel layers of fabric cemented together, said layers being disposed at an angle to all of the faces of the packing-strip, each layer of fabric having a folded marginal portion integral with the margin of the next adjacent layer, the folded marginal portions of said layers extending longitudinally of the packing strip and forming bearing surfaces on all sides of said strip.

2. An angular packing-strip comprising in its construction parallel layers of fabric cemented together, each layer having a folded marginal portion integral with the margin of the next adjacent layer and forming an outer surface portion of the packing-strip, the parallel portions of said layers being disposed at an oblique angle to all of the outside surfaces of the packing-strip.

3. An angular packing-strip comprising in its construction alternate parallel layers of fibrous material and rubber cemented together, said layers being disposed at an oblique angle to all of the side faces of the packing-strip, each layer of fibrous material having a folded marginal portion integral with the marginal portion of the next adjacent layer, and adapted to form outer fibrous bearing portions of the packing-strip, the folded marginal portions of said layers extending longitudinally of the packing strip and forming bearing surfaces on all sides of said strip.

4. An angular packing-strip comprising in its construction parallel layers of fibrous asbestos cemented together, each of said layers of asbestos extending at an oblique angle with respect to all of the outer faces of the packing-strip having a folded marginal portion integral with the marginal portion of an adjacent parallel layer of asbestos and adapted to form a fibrous bearing portion of the packing-strip, the folded marginal portions of said layers extending longitudinally of the packing strip and forming bearing surfaces on all sides of said strip.

5. An angular packing-strip comprising in its construction parallel layers of fibrous asbestos, fibrous organic material, and rubber cemented together and vulcanized, the parallel portions of all of said layers being disposed at an oblique angle to all of the outer surfaces of the packing-strip, each of said layers of asbestos having a folded marginal portion integral with the marginal portion of an adjacent parallel layer of asbestos and adapted to form an outer bearing portion of the packing-strip, the folded marginal portions of said layers extending longitudinally of the packing strip and forming bearing surfaces on all sides of said strip.

6. An angular packing-strip comprising in its construction a sheet of fibrous material having a ply or layer of asbestos and a ply or layer of organic material cemented together, said sheet being folded lengthwise and comprising parallel longitudinal layers each having a folded marginal portion integral with the marginal portion of the next adjacent layer and adapted to form an outer bearing portion of the strip, the folded marginal portions of said layers extending longitudinally of the packing strip and forming bearing surfaces on all sides of said strip.

7. A packing-strip comprising in its construction a plurality of sheets of fabric each folded lengthwise and forming parallel layers of fibrous material, said layers being cemented together and disposed at an angle to all of the faces of the packing-strip, and each layer of fabric having a folded marginal portion integral with the margin of the next adjacent layer, said folded sheets being cemented together and each forming a longitudinal section of the completed packing-strip.

8. A packing-strip comprising in its construction two connected sheets of fabric each forming parallel layers of fibrous material, each layer having a folded marginal portion integral with the marginal portion of the next adjacent layer and adapted to form an outer bearing portion of the packing-strip, the parallel portions of said layers being disposed at an oblique angle to the bearing portions of the packing-strip formed by said outer folded marginal portions of the layers.

9. A packing-strip comprising in its construction two sheets of fabric, each comprising in its construction a ply or layer of asbestos and a ply or layer of organic material cemented together, said sheets being folded lengthwise and forming parallel longitudinal layers each having a folded marginal portion integral with the marginal portion of the next adjacent layer and adapted to form an outer bearing portion of the strip of packing, said folded sheets being cemented together and each forming a longitudinal section of the completed packing-strip.

10. A packing-strip comprising in its construction parallel layers of fabric cemented together, the parallel portions of said layers being disposed at an oblique angle to all of the side faces of the packing-strip formed by said outer folded marginal portions of the layers, each of said layers being narrower than the next adjacent layer in the direction of the center of the packing-strip, each layer of fabric having a folded marginal portion integral with the marginal portion of the next adjacent layer and adapted to form an outer bearing portion of the packing-strip.

In testimony, that I, claim the foregoing as my invention I affix my signature in the presence of two witnesses, this 6th day of May, A. D. 1913.

FRANK A. HEADSON.

Witnesses:
  HATTIE B. LEHMAN,
  EUGENE C. WANN.